United States Patent [19]

Folsom et al.

[11] Patent Number: 5,173,958
[45] Date of Patent: Dec. 22, 1992

[54] BEAM DISTRIBUTOR FOR LASER-TO-OPTICAL FIBER APPLICATION

[75] Inventors: Mark F. Folsom, Carmel; Michael C. Todd, Hollister, both of Calif.

[73] Assignee: Whittaker Ordnance, Inc., Hollister, Calif.

[21] Appl. No.: 822,108

[22] Filed: Jan. 17, 1992

[51] Int. Cl.⁵ .............................. G02B 6/34
[52] U.S. Cl. ......................... 385/36; 385/25; 359/835
[58] Field of Search ............... 385/36, 33, 34, 35, 385/37, 25, 26; 359/834, 835, 836

[56] References Cited

U.S. PATENT DOCUMENTS

| | | | |
|---|---|---|---|
| H855 | 12/1990 | Otto et al. ......................... | 385/36 |
| 4,623,225 | 11/1986 | Forkner ......................... | 359/834 X |
| 4,838,671 | 6/1989 | Papritz et al. ................... | 359/835 X |

Primary Examiner—John D. Lee
Assistant Examiner—Phan T. Heartney
Attorney, Agent, or Firm—Henry M. Bissell

[57] ABSTRACT

A beam distributor apparatus employing an eccentrically mounted retroreflector prism is driven to revolve about a central axis by a motor/encoder to direct an input beam to a plurality of optical fibers in sequence. The retroreflector prism possesses the property of reflecting a beam in a directional parallel to the incident beam but displaced laterally therefrom. In one arrangement, a synchronously triggered laser is used as the light source. In a second embodiment, a non-laser light source is employed with a shutter coupled to be triggered in synchronism with the position of the rotating prism relative to the output optical fibers.

18 Claims, 4 Drawing Sheets

BEAM DISTRIBUTOR FOR LASER-TO-OPTICAL FIBER APPLICATION

BACKGROUND OF THE INVENTION

1. Field of the Invention

This invention relates to beam directors for optical fiber coupling and, more particularly, to such apparatus for sequentially directing a laser beam to a plurality of fibers or optical fiber bundles.

2. Description of the Related Art.

Laser distributors have been built using wedge prisms, rhomboid prisms, acousto-optic cells and optical fibers, to name a few examples, as the distributor elements.

A wedge prism is used to change the propagation direction of a beam of light by a fixed angle, and the plane of that angle can be rotated by rotating the prism about the axis of the beam. Thus, it can direct the output beam along any path at a fixed angle from its original propagation direction. A second wedge prism can be used in conjunction with the first to enable beam steering through a continuous two-dimensional range of angles, so that a two-dimensional array of outputs can be accessed from a single beam directed to the apparatus. In such an arrangement, the wedge prisms alter the input beam by changing both the location and direction of the output. The set of possible output beams that a pair of wedge prisms can produce from a given input beam each have a unique direction and location and do not even pass through a common center or junction point. There is, therefore, no simple way to prevent even minor in the prism positioning from causing the focus of the beam to stay from the center of the output fiber core.

A rhomboid prism can be used to produce an output beam that is exactly parallel to the input beam, but having a laterally displaced axis. By using a proper mounting arrangement and rotating the rhomboid prism about the laser beam axis, the beam can be directed into any one of a number of output devices. The rhomboid prism possesses the property that it can produce an output beam that is parallel to the input beam, but having an axis displaced laterally, relative to the input beam. Thus it can be used as the moving distributor element in a system that is highly error tolerant, provided that the input beam is parallel to the optical axes of the output fibers and the lenses used to focus the distributed beam into the fibers, and also provided that the beam displacement results in the prism output beam falling entirely inside the open aperture of the respective lenses. Such apparatus, however, presents the disadvantage that the prism must be mounted between the laser and the lenses, making it difficult to maintain the required parallelism between the laser beam and the lens axes.

A typical acousto-optic cell consists of a transparent block of material that is attached to a piezoelectric transducer which is in turn driven by a high frequency electric oscillator. The acoustic waves introduced by the piezoelectric transducer into one side of the transparent block cause the formation of alternating layers of compression and dilatation in the block. The set of layers acts as a diffraction grating where the spacing between the layers can be used to control the angle at which the laser beam emerges from the block.

Acousto-optic cells offer very rapid sequencing from one output to another, but require very high frequency oscillators that can be rapidly and cleanly switched from one frequency to another. The system must be temperature compensated at each of the separate oscillator frequencies, must not be affected by radio frequency radiation in the environment, and cannot easily be made error tolerant In such a system, the optical components that are distant from each other must be precisely mounted and rigidly held to function properly. The acousto-optic laser distributor is thus comparatively complex and expensive, and it may be unreliable in severe environments.

A retroreflector prism, sometimes referred to as a trihedral retroreflector or corner cube reflector, has the property that any ray entering the effective aperture will be reflected internally and will emerge from the entrance/exit face parallel to itself but with an opposite direction of propagation. This property of retroreflection with parallelism is, within acceptance angle limits, independent of the orientation of the retroreflector. A retroreflector prism therefore may be appropriate for use in situations where orientation is difficult or impossible to control and where a mirror would therefore be unsatisfactory.

Retroreflector prisms present certain theoretical limitations which may adversely affect their desirable properties of total internal reflection (TIR) and reflected beam parallelism. However, retroreflector prisms are commercially available which have the capability of compensating for such inherently adverse properties and can assure a parallelism between incident and returned beams of two arc seconds or better. Such retroreflector prisms are entirely suitable for inclusion in embodiments of the present invention.

SUMMARY OF THE INVENTION

In brief, arrangements in accordance with the invention combine an eccentrically mounted retroreflector prism in a cylindrical housing having a plurality of lenses and associated optical fibers (or bundles) distributed about the central axis of the housing. The prism is driven to revolve about the central axis and, as it does so, to sequentially direct a beam which is incident along the central axis to the respective lenses and optical fibers in turn, by retroreflection. A system comprising this distributor arrangement may include synchronizing means for firing the associated laser at the time that the prism is positioned to reflect the beam to a particular lens and optical fiber.

In accordance with an alternative aspect of the invention, the laser beam source may be replaced by a central optical fiber fitted with a collimating lens capable of producing a collimated output beam, similar to that of a laser. Such an arrangement can function as an optical fiber-to-optical fiber beam distributor.

BRIEF DESCRIPTION OF THE DRAWING

A better understanding of the present invention may be realized from a consideration of the following detailed description, taken in conjunction with the accompanying drawing, in which.

DESCRIPTION OF THE PREFERRED EMBODIMENTS

Figure 1:
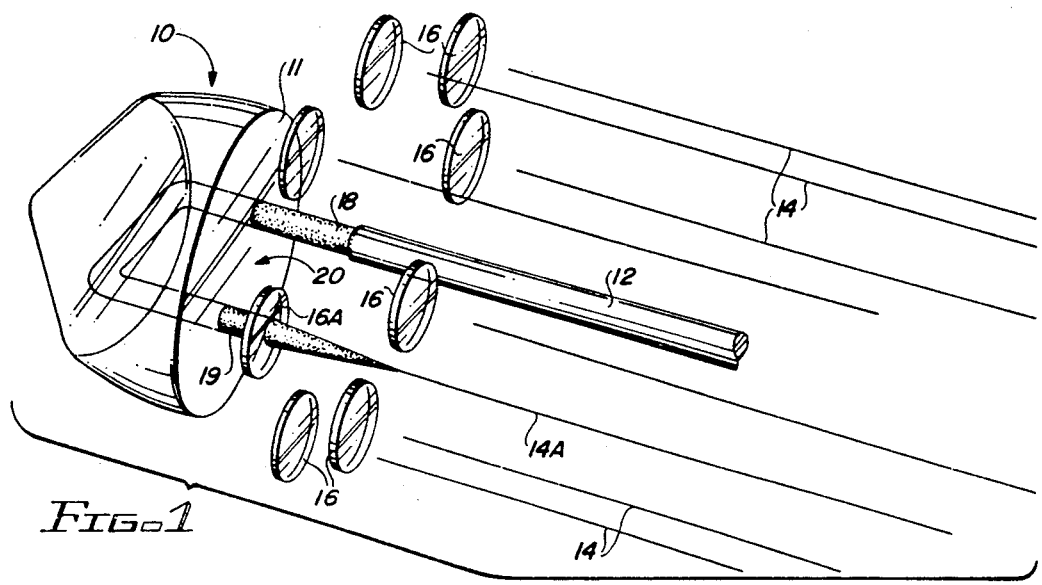
FIG. 1 is a schematic diagram illustrating the operative concept of the invention.

In the conceptual schematic diagram of FIG. 1, a retroreflector prism 10 is shown in spatial juxtaposition with a laser rod 12 and a plurality of optical fibers 14, the latter being represented by parallel straight lines. A corresponding plurality of lenses 16 is shown between the ends of the optical fibers 14 and the prism 10. Each of the lenses 16 is associated with a corresponding one of the optical fibers 14.

As indicated in FIG. 1, a beam 18 from the laser rod 12 enters the prism 10 through the transverse planar face 20 of the prism along a first axis parallel to its central axis and is reflected internally off of three other faces of the prism to exit the prism through the face 20 along a second axis which is parallel to but displaced laterally from both the original entrance beam 18 and the prism central axis. The exit beam 19 is focused by a corresponding one of the lenses, 16A, and enters the corresponding optical fiber 14A. Thus the conceptual diagram of FIG. 1 graphically illustrates the property of a retroreflector prism, retroreflection with parallelism, and indicates the way in which this property is put to use in the practice of the present invention It will be appreciated that if the prism 10 is rotated about the first axis as the laser rod 12 is pulsed repeatedly, the resulting laser beam pulses may be sequentially directed to various ones of the optical fibers 14.

Figure 2:
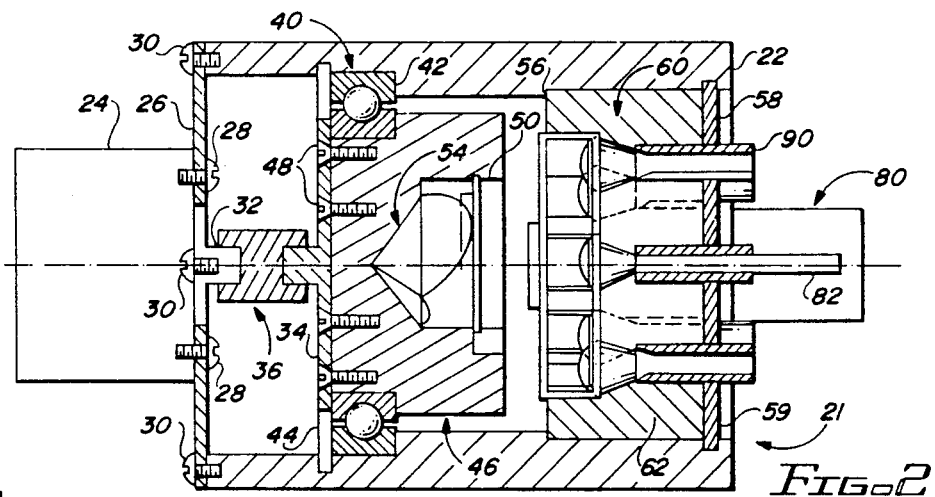
FIG. 2 is a side sectional view of one particular arrangement in accordance with the invention.

FIG. 2 shows a particular embodiment of the present invention for developing the operation which is conceptually illustrated in FIG. 1.

The beam distributor 21 of FIG. 2 is shown comprising a barrel housing 22 with a motor/encoder 24 mounted coaxially at the left end thereof by means of a disk-shaped mounting plate 26. The motor/encoder 24 is secured to the mounting plate 26 by screws 28. The motor mount plate 26 in turn is secured to the housing 22 by a plurality of screws 30. The motor shaft 32 is coupled to a rotatable bearing retainer plate 34 by a shaft coupler 36.

Ball bearing 40 is fixedly mounted in the housing 22, held between an annular shoulder portion 42 and a retaining clip 44 installed in an annular recess in the housing. The bearing retainer plate 34 is secured to one end of a prism housing 46 by means of a plurality of screws 48. The configuration of the prism housing 46 is such that it is clamped against the inner race of the ball bearing 40 by the bearing retainer plate 34 which maintains a clearance fit with the retainer clip 44.

Figure 3:
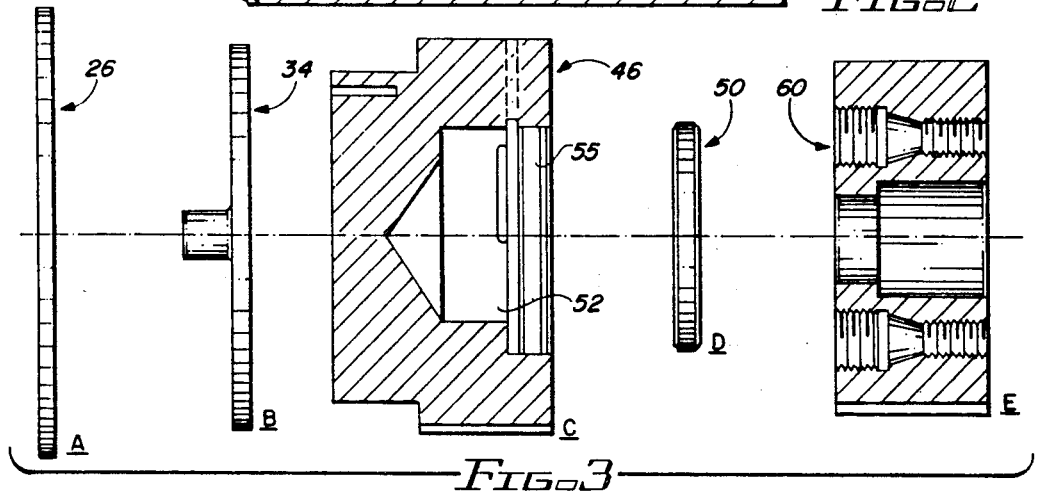
FIG. 3 with parts A-E is a schematic expanded view showing the juxtaposition of some of the elements of FIG. 2 with some being shown in section.

Reference to FIG. 3 in connection with the description of FIG. 2 may assist in the understanding of the structural arrangement of the invention. Some of the elements of the beam distributor of FIG. 2 are displayed in FIG. 3 in relative juxtaposition to each other for a better understanding thereof. Thus the motor mount plate 26 is schematically represented in FIG. 3A, the bearing retainer 34 is shown in FIG. 3B, the prism housing 46 is in FIG. 3C, and a prism retainer 50 and optics block 60 are shown in FIGS. 3D and 3E, respectively.

The prism housing 46 is shown having a hollowed out portion 52 which is shaped to receive a retroreflection prism 54. The hollowed out portion 52 is offset from the central axis of the beam distributor 20 (see FIG. 6C) and is threaded at the entrance opening 55 thereof to receive the lens retainer 50.

The optics block 60 is installed within the cylindrical housing 22 near the right-hand end thereof and is held in position bearing against an annular shoulder 56 by means of a retainer clip 58, the latter being mounted within an annular recess 59 within the housing 22.

Figure 4:
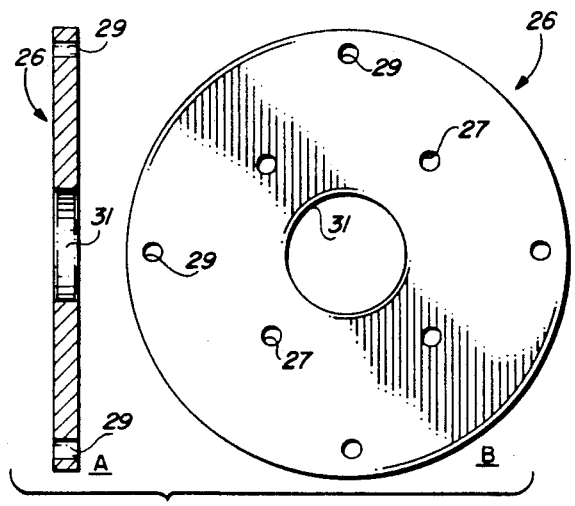
FIG. 4, views A and B, shows side sectional and end views of a motor mount plate of the arrangement of FIG. 2.

As best seen in FIG. 4, the motor mount plate has a first plurality of holes 27 for receiving the screws 28 and another plurality of holes 29 for the housing mounting screws 30. There is also a central opening 31 for the motor shaft 32.

Figure 5:
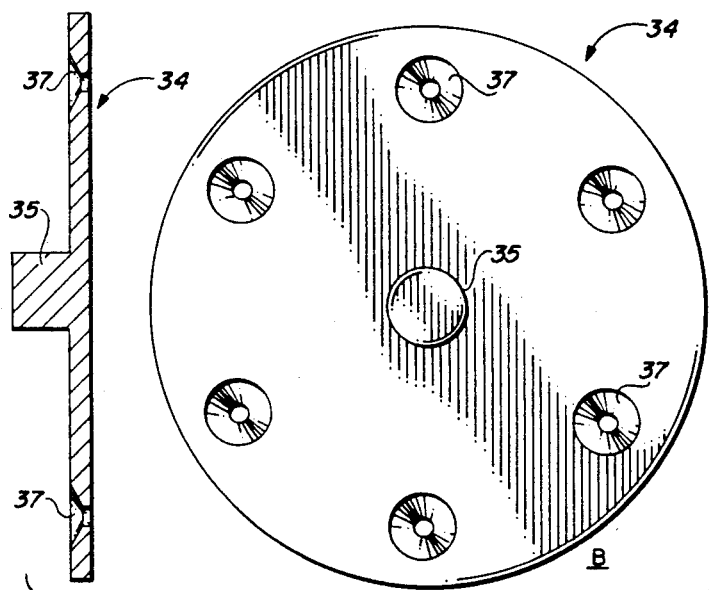
FIG. 5, views A and B, depicts side sectional and end views of a ball bearing retainer plate of the arrangement of FIG. 2.

As best seen in FIG. 5, the bearing retainer plate 34 is generally disk-shaped with a central hub 35 projecting along the central axis for engagement with the shaft coupler 36. A plurality of countersunk screw holes 37 is provided about the periphery of the retainer plate 34 for receiving the flat head screws 48.

Figure 6:
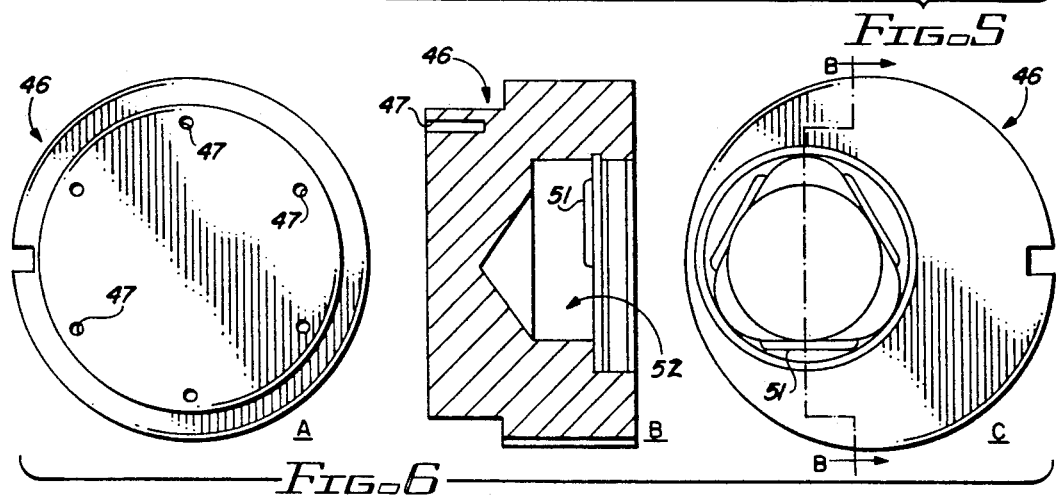
FIG. 6, views A–C, represents left end, side sectional and right end views of a prism housing of the arrangement of FIG. 2.

Further details of the prism housing 46 are shown in the three views in FIG. 6, FIG. 6B being a side sectional view taken along the line B—B of FIG. 6C and looking in the direction of the arrows. In FIG. 6A, mounting holes 47 are shown about the periphery of the left-hand face of the prism housing 46 for receiving the screws 48 which mount the bearing retainer plate 34 thereon. The mounting arrangement for the prism 54 is best shown in FIG. 6C as comprising a recess 51 which receives and locates the prism 54 in an eccentric position within the well 52 of the prism housing 46. The center of the well 52 and the prism 54 is off-axis by about 0.35 inch in the 2⅛ inch diameter prism housing 46.

Figure 7:
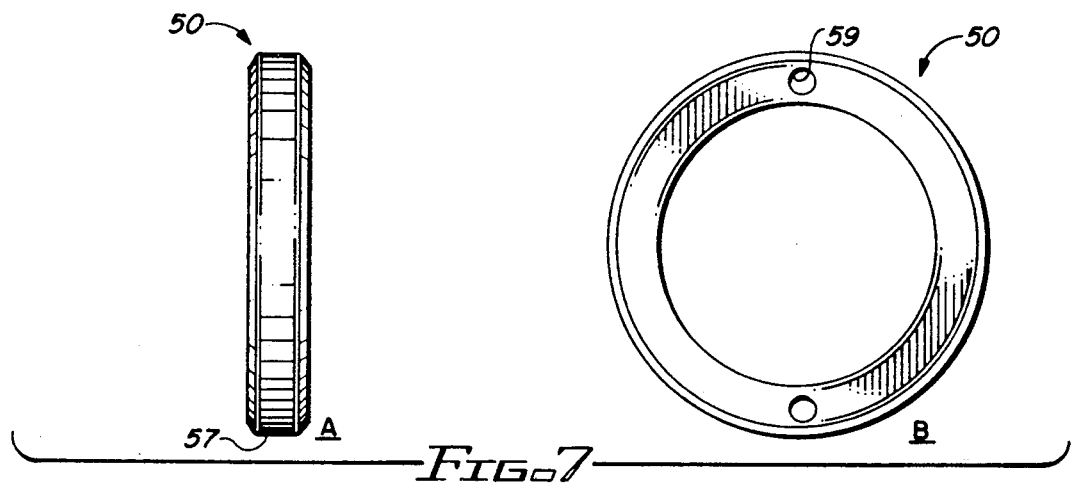
FIG. 7, views A and B, depicts side and end views of a prism retainer of the arrangement of FIG. 2.

FIG. 7 shows further details of the prism retainer 50 which has threads 57 and a pair of spanner holes 59 for threading the retainer 50 into the threaded portion 55 of the prism housing 46.

Figure 8:
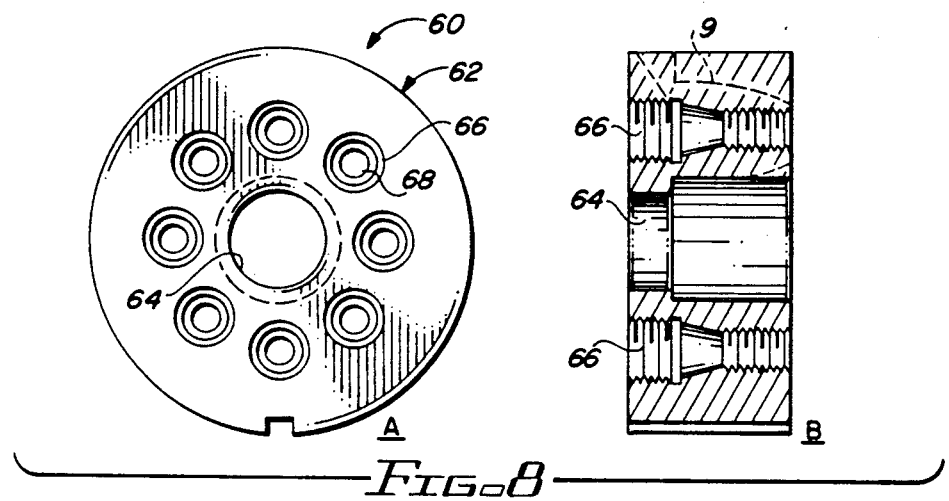
FIG. 8, views A and B, depicts left end and side sectional views of an optics block of the arrangement of FIG. 2.
Figure 9:
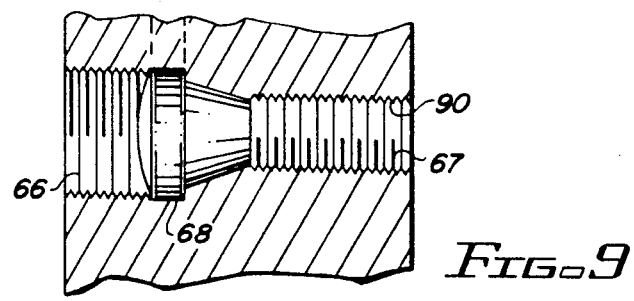
FIG. 9 is an enlarged view of a portion of FIG. 8B.

Further details of the optics assembly 60 are shown in FIGS. 8 and 9, FIG. 9 being an enlargement of the portion outlined by the broken line 9 in FIG. 8B.

The optics assembly 60 comprises the shell or block 62 having a central opening 64 and a plurality of circumferentially displaced openings 66 (eight in the arrangement shown herein) for installing the optical fibers to which the laser beam is distributed. Within each opening 66 is a lens 68 which is held in position by a threadably engaged lens retainer 70 (see FIG. 10). A laser housing 80 is installed within the central opening 64 and mounts a laser rod 82 therein in position along the central axis of the distributor apparatus 21.

Figure 10:
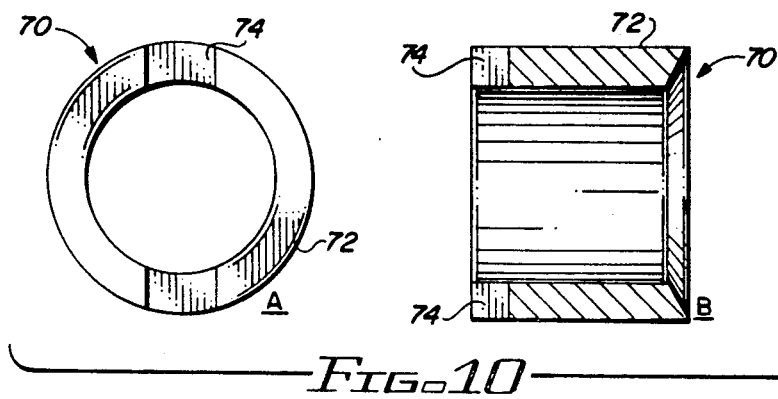
FIG. 10, views A and B, depicts left end and side sectional view of a lens retainer of the arrangement of FIG. 2.

Further details of the lens retainer 70 are shown in FIG. 10. The lens retainer 70 has a plurality of external threads 72 and a pair of diametrically juxtaposed cutouts 74 for receiving a spanner for mounting the lens retainer 70 to fix the corresponding lens 68 in place.

Figure 11:
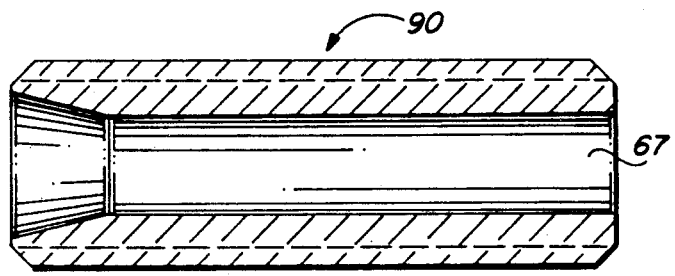
FIG. 11 is a side sectional view of an optical fiber adapter of the arrangement of FIG. 2.

An optical fiber adapter 90 (see FIG. 11) is threaded into the optics block 62 at the rearward end of a corresponding one of the openings 66. This adaptor 90 serves to receive and retain one end of an optical fiber to be installed within a fiber opening 67 in a position relative to the lens 68 to achieve the proper coupling of the laser beam into the optical fiber.

The combination of the optical fiber adaptor 90 and the lens retainer 70 serve to mount the lens 68 and the associated optical fiber end in a spatial juxtaposition such that the optical axis of the optical fiber is parallel to the incident beam axis, with the optical fiber end being located at the intersection of the optical axis and image plane of the lens. This provides the optimum coupling of the laser beam, as directed by the prism, into the optical fiber to provide maximum tolerance for positioning errors during operation of the apparatus of the invention.

Figure 12:
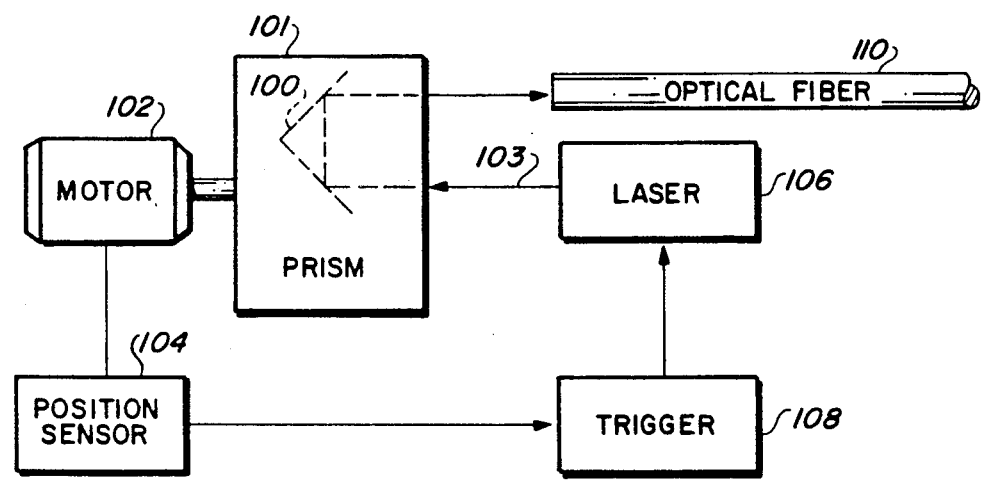
FIG. 12 is a schematic block diagram of a system incorporating the arrangement of FIG. 2.

FIG. 12 represents in block diagram form one particular arrangement in accordance with the invention, corresponding to the laser beam distributor apparatus of FIG. 2. The arrangement of FIG. 12 includes a prism 100 in a prism housing 101 coupled to a motor 102 for rotation about the housing central axis 103. A position sensor or encoder 104 is associated with the motor 102 to develop synchronizing pulses for a laser 106 via a trigger stage 108. A plurality of optical fibers 110, only one of which is depicted in FIG. 12, is arrayed about the central laser 106 in the manner indicated in FIG. 2. In the arrangement represented in FIG. 12, as the prism 100 is revolved about the axis 103 by the motor 102, laser triggering pulses are developed by the trigger stage 108 at appropriate intervals determined by the encoder 104 and directed to the laser 106 to stimulate the lasing action. The resulting laser beam is directed into the retroreflector prism 100 and reflected back out at the appropriate rotational angle to couple with the correspondingly positioned optical fiber 110. In this way, the beam from the laser 106 is directed to the associated plurality of optical fibers 110 in turn, thus achieving the desired distribution of the laser beam into the various optical fibers or bundles, represented by the block 110 in FIG. 12.

Figure 13:
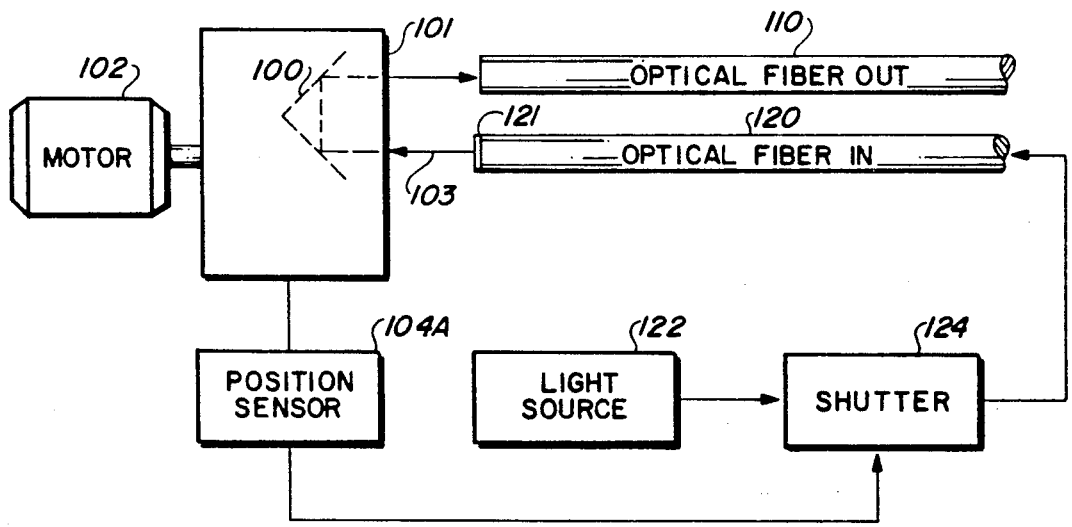
FIG. 13 is a schematic block diagram of an alternative system incorporating the arrangement of FIG. 2.

FIG. 13 depicts a slightly different light distributing arrangement wherein a light source 122 is used in place of the laser 106 of the arrangement described hereinabove. In FIG. 13, the retroreflector prism 100 and the motor 102 are arranged as in FIG. 12. Similarly, a like plurality of optical fibers 110 is provided, of which only one is shown in FIG. 13. Light is directed into the prism 100 via a centrally located, input optical fiber 120. The optical fiber 120 receives its light input from the light source 122 via a shutter 124. As a variation of the arrangement of FIG. 12, a position sensor or encoder 104A is shown coupled to sense the rotation of the prism 100 and, at appropriate intervals, generates signals which trigger the shutter 124 to conduct light from the light source 122 into the input optical fiber 120. The output is collimated by a lens 121 and enters the prism 100. As with the laser input beam of FIG. 12, light from the optical fiber 120 is directed by retroreflection in the revolving prism 100 into each of the output optical fibers 110 in turn.

In this manner, an incident beam is directed sequentially to a plurality of circumferentially positioned optical fibers. By virtue of the distinctive property of the retroreflector prism which propagates an incident beam in the opposite direction but parallel to the input, an extremely simple and reliable mechanism is provided which serves to develop the desired beam distribution to the respective optical fibers. The fixed juxtaposition of each output optical fiber and its corresponding input lens results in enhanced tolerance for errors in the positioning of the laser beam, alignment of the distributor prism, and other structural aberrations which may introduce errors in the system. The apparatus of the invention is simple and rugged in construction, is relatively easy to manufacture, is reliable in operation, and is not subject to the sensitivities and disadvantages of known devices which have been devised for a similar purpose in the past.

Although there have been described hereinabove various specific arrangements of a beam distributor for laser-to-optical fiber application in accordance with the invention for the purpose of illustrating the manner in which the invention may be used to advantage, it will be appreciated that the invention is not limited thereto. Accordingly, any and all modifications, variations or equivalent arrangement may occur to those skilled in the art should be considered to be within the scope of the invention as defined in the annexed claims.

What is claimed is:

1. Beam directing apparatus for sequentially coupling a reflected beam to a plurality of circumferentially distributed optical fibers comprising:
   means for directing an incident light beam along an incident beam axis;
   a retroreflector prism having a central axis, a plurality of faces arranged to form a corner cube, and a transverse planar face opposing said corner cube;
   means including a prism housing for mounting said prism with its central axis parallel to but laterally displaced from said incident beam axis and with the transverse planar face directed to receive said incident beam;
   a plurality of spatially separate optical fiber means mounted in a circumferential array centered on said incident beam axis, said optical fiber means extending parallel to said central axis in corresponding positions to receive beams reflected from said prism;
   means for rotating said housing to revolve the prism about the incident beam axis in order to direct light beams reflected from said prism to said fiber optic means in sequence; and
   means associated individually with each of said optical fiber means for coupling a reflected beam with a corresponding one of said optical fiber means as said housing rotates with said prism mounted therein.

2. The apparatus of claim further comprising an external housing having a central bore for containing said prism housing and a central longitudinal axis coincident with said incident beam axis.

3. The apparatus of claim 2 further including a bearing transversely mounted within said external housing and means for attaching said prism housing to a movable portion of said bearing for controlled rotation about said central axis.

4. The apparatus of claim 3 further including a transverse end plate secured to a first end of said external housing, a motor having a central shaft, and means for mounting said motor to said end plate with the motor shaft coincident with said central axis.

5. The apparatus of claim 4 further including a shaft coupling member extending between said motor shaft and said prism housing for transmitting driving torque from the motor to said prism housing.

6. The apparatus of claim 4 further including optical fiber mounting means installed within the bore of said external housing adjacent a second end of said housing.

7. The apparatus of claim 6 wherein said optical fiber mounting means defines a plurality of longitudinal apertures arrayed in generally equally spaced positions about said central axis.

8. The apparatus of claim 7 including means for retaining said optical fiber means in corresponding ones of said longitudinal apertures and means for mounting a lens in each of said apertures such that each optical fiber optical axis is parallel to the incident beam axis and each of optical fiber end lies at the intersection of the optical axis with the image plane at the corresponding lens.

9. The apparatus of claim 8 wherein said optical fiber means comprise an individual optical fiber in each of said longitudinal apertures.

10. The apparatus of claim 8 wherein said optical fiber means comprise a fiber optics bundle in each of said longitudinal apertures.

11. The apparatus of claim 4 further including encoding means associated with said motor for sensing the angular rotation of the motor.

12. The apparatus of claim 11 wherein said incident light beam directing means comprise a collimating lens mounted within said external housing in a transverse orientation and centered on said incident beam axis so as to direct said incident light beam along the center of rotation of said prism.

13. The apparatus of claim 12 further including means for generating said incident light beam as a series of light pulses at predetermined regular intervals.

14. The apparatus of claim 13 wherein said incident light beam generating means comprise a laser mounted in line with said central axis and pulsed in response to signals from said encoding means.

15. The apparatus of claim 12 further including a light source and a shutter device for controlling the transmission of light from said source, and optical fiber means mounted to transmit light from the output of said shutter device to said collimating lens for transmission to said prism.

16. The apparatus of claim 15 further including means for controlling said shutter to alternatively transmit and block light from said light source in accordance with the rotational position of said prism.

17. Beam directing apparatus for sequentially coupling a reflected light beam to a plurality of circumferentially distributed optical fibers comprising:
   a retroreflector prism having the capability of internally reflecting an incident light beam to develop an exit beam which is displaced from and parallel to the incident beam axis;
   means for driving the prism to revolve about said incident beam axis;
   a plurality of optical fiber elements mounted in a circumferential array centered on said incident beam axis and mounted in positions to receive an exit beam from the prism when the beam is aligned therewith;
   a plurality of lenses, one for each optical fiber element;
   means for mounting each lens in front of a corresponding optical fiber element such that the input end of the optical fiber element lies at the intersection of the optical axis with the image plane of the corresponding lens; and
   means for pulsing said incident light beam to create an exit beam in synchronism with the exit beam alignment with corresponding ones of said optical fiber elements in sequence.

18. The method of sequentially directing a reflected light beam to a plurality of circumferentially distributed optical fibers comprising the steps of:
   mounting a retroreflector prism in a position to receive an incident beam and develop a corresponding reflected beam along a line which is parallel to and displaced from the axis of the incident beam;
   driving the retroreflector prism to revolve about the incident beam axis;
   sensing the angular position of the prism as it revolves about said axis;
   pulsing the incident light beam in synchronism with the sensing of the prism position at predetermined angles of rotation; and
   positioning a plurality of optical fiber elements about said incident beam axis in positions to receive succeeding reflected light beams during pulsing of said incident beam.

* * * * *